(12) United States Patent
Winter

(10) Patent No.: US 11,480,954 B2
(45) Date of Patent: Oct. 25, 2022

(54) METHOD AND SYSTEM FOR MONITORING THE OPERATION OF AT LEAST ONE DRIVE COMPONENT

(71) Applicant: Siemens Aktiengesellschaft, Munich (DE)

(72) Inventor: Jens Winter, Hessisch Lichtenau (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/298,343

(22) PCT Filed: Nov. 13, 2019

(86) PCT No.: PCT/EP2019/081240
§ 371 (c)(1),
(2) Date: May 28, 2021

(87) PCT Pub. No.: WO2020/109005
PCT Pub. Date: Jun. 4, 2020

(65) Prior Publication Data
US 2022/0043437 A1     Feb. 10, 2022

(30) Foreign Application Priority Data
Nov. 30, 2018   (EP) .................................. 18209532

(51) Int. Cl.
*G05B 23/02*     (2006.01)
*H02P 23/00*     (2016.01)
(Continued)

(52) U.S. Cl.
CPC ...... *G05B 23/0243* (2013.01); *H02P 23/0022* (2013.01); *H02P 23/14* (2013.01); *G05B 17/00* (2013.01)

(58) Field of Classification Search
None
See application file for complete search history.

(56) References Cited

U.S. PATENT DOCUMENTS

| | | | |
|---|---|---|---|
| 2012/0239348 A1 | 9/2012 | Banerjee et al. | |
| 2017/0155703 A1 | 6/2017 | Hao et al. | |

(Continued)

FOREIGN PATENT DOCUMENTS

| | | |
|---|---|---|
| CN | 106529054 A | 3/2017 |
| EP | 3118605 A1 | 1/2017 |

(Continued)

OTHER PUBLICATIONS

Wang et al., "STEP-compliant NC research: the search for intelligent CAD/CAPP/CAM/CNC", International Journal of Production Research Sep. 2005 (Year: 2005).*

(Continued)

*Primary Examiner* — Carlos R Ortiz Rodriguez
(74) *Attorney, Agent, or Firm* — Henry M. Feiereisen LLC

(57) ABSTRACT

The speed and security of the monitoring the operation of a drive component is improved by transferring data relating to the drive component and/or to the operation of the drive component to a central IT infrastructure. Within the central IT infrastructure, the transferred data are associated with a first model of the drive component, and with a second model of at least one virtual component associated with the first model. An operating state of the drive component is determined from a correlation of the first and second models.

16 Claims, 2 Drawing Sheets

(51) Int. Cl.
*H02P 23/14* (2006.01)
*G05B 17/00* (2006.01)

(56) References Cited

U.S. PATENT DOCUMENTS

| | | | |
|---|---|---|---|
| 2017/0286841 | A1 | 10/2017 | Yoshinaga et al. |
| 2018/0106261 | A1 | 4/2018 | Zhang et al. |
| 2018/0284735 | A1 | 10/2018 | Cella et al. |
| 2019/0267923 | A1 | 8/2019 | Anders et al. |

FOREIGN PATENT DOCUMENTS

| | | |
|---|---|---|
| EP | 2 233 088 A1 | 5/2018 |
| EP | 3 322 088 A1 | 5/2018 |

OTHER PUBLICATIONS

PCT International Examination Report and Written Opinion of International Examination Authority dated Nov. 2, 2020 corresponding to PCT International Application No. PCT/EP2019/081240 filed Nov. 13, 2019.

Dovgal V.A. et al: "Problems and tasks of the security of intelligent,networks based on the Internet of Things": Bulletin of Asu; No. 4, vol. 211, Year: 2017.

Barskov A.: "APCS or Industrial Internet of Things"; Sep. 11, 2016, [found: Jan. 18, 2022] Found in: https://web.archive.org/web/20161109180239/https://www.osp.ru/eforum/2016/10/1305069.html.

* cited by examiner

METHOD AND SYSTEM FOR MONITORING THE OPERATION OF AT LEAST ONE DRIVE COMPONENT

CROSS-REFERENCES TO RELATED APPLICATIONS

This application is the U.S. National Stage of International Application No. PCT/EP2019/081240, filed Nov. 13, 2018, which designated the United States and has been published as international Publication No. WO 2020/109005 A1 and which claims the priority of European Patent Application, Serial No. 18209532.3, filed Nov. 30, 2018, pursuant to 35 U.S.C. 119(a)-(d).

BACKGROUND OF THE INVENTION

The invention relates to a method for monitoring the operation of at least one drive component.

The invention relates, moreover, to a system for monitoring the operation of at least one drive component.

The invention relates, furthermore, to a computer program for carrying out a method of this kind when run in a central IT infrastructure.

The invention relates, moreover, to a computer program product with a computer program of this kind.

Data from different types of components is acquired and stored within the framework of digitalization and the use of, in particular cloud-based open, IoT (Internet of Things) systems. The data relating to the respective components is arranged, for example, in the form of a list. An arrangement of this kind does not reflect the functional correlation.

In particular for a drive technology-related system, functional linking of the component data of a drive train is expedient in order to determine measured values, fault diagnoses and functional correlations, for example of problems or malfunctions, quickly and reliably. Immediate and extensive comparability of measured data increases the diagnostic capability and the recognition of correlations between faults of individual components in the overall system.

Unexamined patent application EP 3 322 088 A1 describes a method for monitoring the operation of an electrical rotating machine with a rotor, a stator and a machine housing in which the rotor and the stator are housed. In order make it possible to carry out the method without structural changes to the electrical rotating machine, it is proposed that a first physical variable of the stator and a second physical variable of the rotor is measured outside of the machine housing, with at least one state variable of the electrical rotating machine being determined from the first physical variable and from the second physical variable.

Unexamined patent application EP 3 118 605 A1 describes a method for monitoring a bearing system, in particular of an electrical machine, which has a shaft section. A first torque applied to the shaft section and a second torque applied by the shaft section are detected. A difference between the first torque and the second torque is formed, and a fault is identified if the difference is greater than a first limit value.

Unexamined patent application US 2018/0106261 A1 describes a method which includes the following steps: detecting whether the compressor has a fault using performance-based modeling and structure-based modeling of physical aspects, which are connected with the operation of the compressor; diagnosing any detected fault in order to determine the cause or causes of the fault; and evaluating any diagnosed fault in order to assess the significance of the fault.

Unexamined patent application US 2012/0239348 A1 describes a method for monitoring the functional capability of a mechanical drive train. The method includes obtaining voltage and current signals from at least one phase of an electrical machine, which is coupled to the mechanical drive train. The method also includes representing the electrical machine, which has a non-sinusoidal flow distribution, as a combination of a plurality of sinusoidally distributed virtual electrical machines corresponding to a harmonic order based on the obtained voltage and current signals. The method also includes determining a torque profile which is assigned to one or more combination(s) of the sinusoidally distributed virtual electrical machines. Finally, the method includes detecting the presence of an anomaly in the mechanical drive train on the basis of the torque profile or torque spectrum.

The object of the invention is to disclose a method for monitoring the operation of at least one drive component, which provides improved speed and security.

SUMMARY OF THE INVENTION

The object is achieved by a method for monitoring the operation of at least one drive component, wherein data relating to the at least one drive component and/or one operation of the at least one drive component is transferred to a central IT infrastructure, wherein the transferred data within the central IT infrastructure is assigned to a model of the at least one drive component, wherein a model of at least one virtual component is assigned to the model of the at least one drive component, wherein the model of the virtual component simulates a technical behavior of a component which is electrically or mechanically connected to the drive component, wherein an operating state of the drive component is determined with the aid of a correlation of the models.

The object is also achieved by a system for monitoring the operation of at least one drive component, which has a device for transferring data relating to the at least one drive component and/or an operation of the at least one drive component to a central IT infrastructure, a model of the at least one drive component within the central IT infrastructure, to which the transferred data of the at least one drive component is assigned, a model of at least one virtual component, which is assigned to the model of the at least one drive component, wherein the model of the virtual component simulates a technical behavior of a component which is electrically or mechanically connected to the drive component, and an evaluation unit which is provided to determine an operating state of the drive component with the aid of a correlation of the models.

The object is also achieved by a computer program for carrying out a method of this kind when run in a central IT infrastructure.

The object is achieved, moreover, by a computer program product with a computer program of this kind.

The advantages and preferred embodiments detailed below in relation to the method may logically be transferred to the system, the computer program and the computer program product.

The invention is based on the consideration of interpreting data relating to at least one drive component in a drive system and/or one operation of the at least one drive component as quickly and securely as possible by transferring the data to a central IT infrastructure and assigning it there to a corresponding model. A drive system has, for example, at least one protection system, a safety device, a transformer, a filter, an inverter, a motor, a gear and/or a bad. A central IT infrastructure is, for example, at least one local computer system and/or at least one, in particular cloud-based open, IoT system. The central IT infrastructure provides storage space, computing power and/or application software. Storage space, computing power and/or application software are provided as a service via the Internet in an IoT system. The corresponding model maps in particular a technical behavior of the drive component. Furthermore, a model of at least one virtual component is assigned to the model of the at least one drive component. The assigning establishes a functional link between the models. In particular, the model of the virtual component simulates the technical behavior of a component which is electrically or mechanically connected to the drive component. The model of the virtual component is assigned, for example, by a user or automatically. For example, the drive component is a generator and the model of the virtual component maps the behavior of a turbine. An operating state of the drive component is determined with the aid of a correlation of the models. The reliability in the case of a fault diagnosis is improved and a reaction time when faults occur is reduced due to the functional link of the models and the correlation. Furthermore, maintenance of the at least one drive component is simplified.

In a preferred embodiment, the data relating to the at least one drive component comprises an individual product identification. An individual product identification is, for example, a serial number which identifies not only the product type, but a possibly individualized embodiment of a product type. A model of the respective drive, component with at least one individualized technical parameter can be stored in the central IT infrastructure as a result of an individual product identification, so the drive component can be mapped very precisely by the model.

Particularly advantageously, the model of the at least one drive component is automatically assigned on the basis of the individual product identification. For example, the model of a serial number is uniquely assigned in a database. The automatic assignment accelerates data processing and increases ease of use.

In a further advantageous embodiment, at least one characteristic curve is used when determining the operating state of the drive component. A characteristic curve is assigned to the model of a drive component and/or to the model at least of one further, in particular virtual, component. In particular, a characteristic curve maps technical properties of the drive component as a function of at least one parameter. For example, a rotation speed torque characteristic curve is used for an asynchronous machine. Optionally, a family of characteristic curves is used, which maps a multi-dimensional parameter dependency. A complex technical behavior of a component can be determined quickly and reliably by the use of characteristic curves.

In a preferred embodiment, at least some of the data relating to the operation of the at least one drive component is determined by at least one sensor. The reliability of the monitoring of the at least one drive component in the drive system is improved by the use of sensors. In particular, fault diagnosis is made easier.

Particularly advantageously, a temperature, a vibration and/or a magnetic field are measured by at least one sensor. Sensor systems of this kind can be used without structural changes to the drive component and enable reliable and accurate measurement.

In a preferred embodiment, an actual value for at least one operating parameter is determined on the basis of the data of the at least one sensor, wherein a target value for the at least one operating parameter is determined on the basis of a correlation of the models, wherein an operating state of the drive component is determined from the target value and the actual value of the at least one operating parameter. The reliability of the monitoring of the operation of the drive component is improved by correlation of the functionally linked models by incorporating measured sensor data.

Particularly advantageously, the operating state of the drive component is determined with the aid of at least one comparison operation. For example, at least one target value and one actual value are compared with each other for determination of an operating state. A comparison operation of this kind is easy to implement, it being possible to establish a faulty operating state quickly and reliably.

In a further advantageous embodiment, at least one drive component is designed as an electrical rotating machine, wherein the data relating to the operation of the at least one electrical rotating machine comprises at least one rotation speed and/or one torque. A rotation speed and/or a torque have proven to be simple and reliable for characterizing the operation of an electrical rotating machine.

In a further advantageous embodiment, at least one drive component is designed as an inverter, wherein the data relating to the operation of the at least one inverter comprises at least one DC-link voltage and/or an input current of the inverter. A DC-link voltage and/or an input current have proven to be simple and reliable for characterizing the operation of an inverter.

Particularly advantageously, the data is read at least partially from an optically readable code. An optically readable code is, for example, a barcode, a QR code or a data matrix code. Optically readable codes of this kind can be read easily and quickly.

In a preferred embodiment, the data is at least partially transferred via a network interface to the central IT infrastructure. For example, the data is transferred by means of an Ethernet interface or wirelessly via WIFI. A data transfer via a network interface is simple and secure.

In a further advantageous embodiment, at least one variable characterizing the operating state of the drive component is graphically represented. The graphical representation improves the clarity so the reaction time when faults occur is reduced.

BRIEF DESCRIPTION OF THE DRAWING

The invention will be described and explained in more detail below with reference to the exemplary embodiments represented in the figures.

In the figures.

DETAILED DESCRIPTION OF PREFERRED EMBODIMENTS

Figure 1:
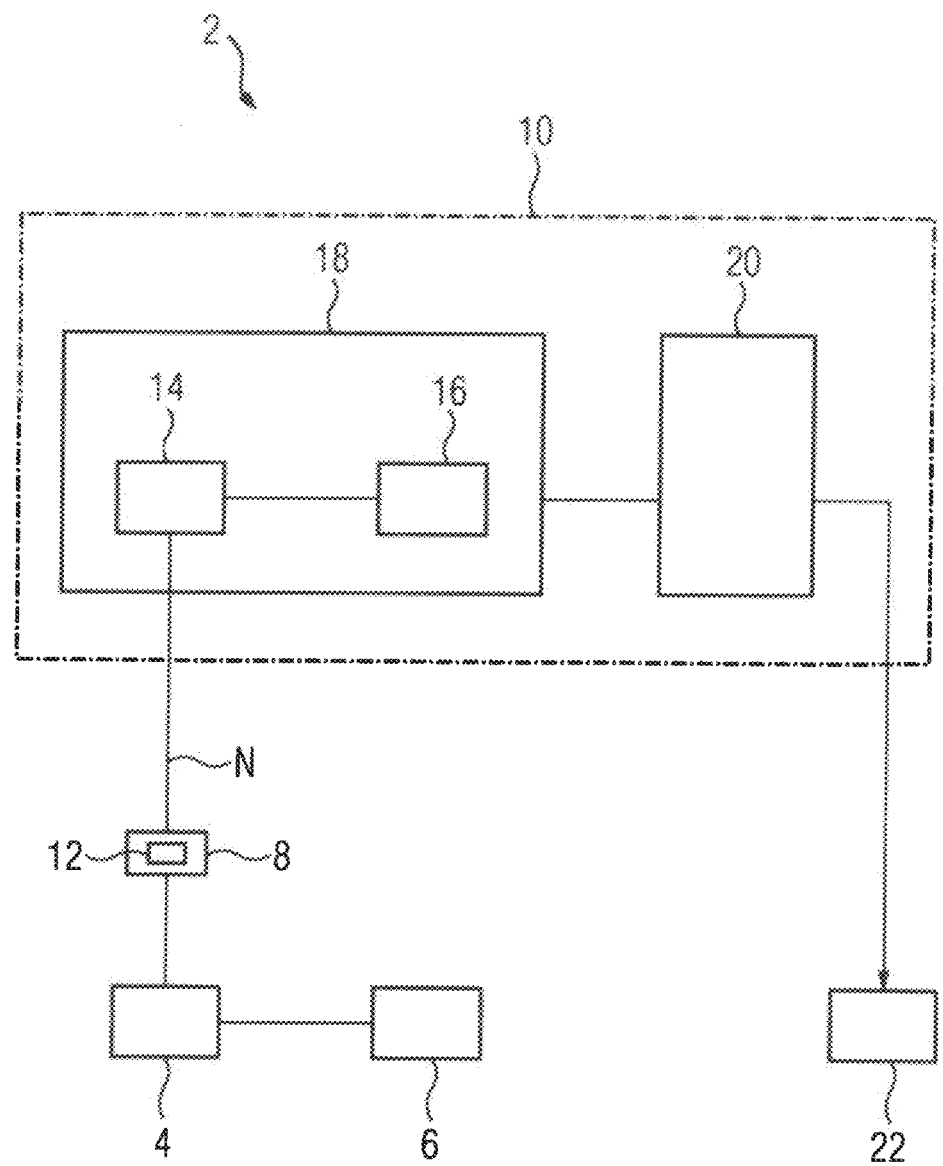
FIG. 1 shows a block diagram of a first embodiment of a system for monitoring the operation of a drive component and FIG. 2 shows a block diagram of a second embodiment of a system for monitoring the operation of a drive component.

The exemplary embodiments explained below are preferred embodiments of the invention. In the exemplary embodiments, the described components of the embodiments each represent individual features of the invention which are to be considered independently of each other and which each develop the invention independently of each other also and should therewith also be regarded individually or in a combination other than that shown as an integral part of the invention. Furthermore, the described embodiments can also be supplemented by further features of the invention already described.

Identical reference numerals have an identical meaning in the various figures.

FIG. 1 shows a block diagram of a system 2 for monitoring the operation of a drive component 4. The drive component 4 is designed as a motor, connected to a load device 6 which is designed as a pump and is used for driving the load device 6.

The drive component 4 has a device 8 which transfers data relating to the drive component 4 and/or an operation of the drive component 4 to a central IT infrastructure 10. A device 8 of this kind is, for example, a sensor box which provides data acquired by the sensor box, in particular of the central IT infrastructure 10, via a communications interface. The central IT infrastructure 10 is, for example, at least one local computer system and/or at least one, in particular cloud-based open, IoT system. The central IT infrastructure 10 provides storage space, computing power and/or application software. Storage space, computing power and/or application software are provided as a service via the Internet in an IoT system. Data relating to the drive component 4 comprises an individual product identification, for example a serial number. In addition, data relating to an operation of the drive component 4 comprises sensor data which is determined by at least one sensor 12. The sensor 12 is designed as a temperature sensor, a vibration sensor and/or as a magnetic field sensor. In particular, a vibration sensor detects a vibration which contains frequency components dependent on a rotor speed, so, for example, a rotor speed can be determined with the aid of the vibration data. A magnetic field sensor detects, for example, a stator frequency and/or a slip frequency.

The data is transferred at least partially via a network interface N to the central IT infrastructure 10. For example, the data is transferred by means of an Ethernet interface or wirelessly via WiFi. Optionally, at least some of the data, for example the serial number of the drive component 4, is read via a reader from an optically readable code. An optically readable code is, for example, a barcode, a QR code or a data matrix code, wherein a reader is, for example, a smartphone or a tablet with a camera. Optionally, the optically readable code comprises at least some of the sensor data and varies dynamically so some of the sensor data of the optically readable code is transferred via the reader to the central IT infrastructure 10. A dynamically variable code can be represented on a display or an ePaper.

In the central IT infrastructure 10, a model 14 is assigned, in particular automatically, to the drive component 4 on the basis of the transmitted serial number, with the serial number defining an individual model 14. An individual model 14 of the drive component 4 is a model 14 which is assigned to this specific serial number and has at least one individualized technical parameter, such as a range of an operating performance.

A model 16 of a virtual component is assigned to the model 14 of the drive component 4, with the virtual component mapping technical properties of the bad device 6. The models 14, 16 are stored in a model database 18 in the central IT infrastructure 10 and can be retrieved from there.

For example, the model 16 of the virtual component comprises at least one pump characteristic curve of the load device 6 designed as a pump. The model 16 of the virtual component optionally comprises a tolerance band assigned to the at least one pump characteristic curve. The virtual component is assigned, for example, manually by a user or automatically, for example on the basis of data relating to the serial number stored in the central IT infrastructure 10.

An actual value for at least one operating parameter of the drive component 4 is determined with the aid of the sensor data. For example, a rotation speed of the drive component 4 designed as a motor, and a torque are determined from vibration data determined by a vibration sensor and from field data determined by a magnetic field sensor.

Furthermore, a target value is determined from a correlation of the model 14 of the drive component 4 and the model 16 of the virtual component for the at least one operating parameter of the drive component 4. For example, the necessary torque of a pump is correlated as a function of a rotation speed with the rotation speed torque characteristic curve of a motor in order to obtain a target value for an operating point.

In an evaluation unit 20, an operating state is determined from the actual value and target value of the at least one operating parameter of the drive component 4. The operating state is determined, for example, with the aid of at least one comparison operation. The operating state is output at an output unit 22. An output unit 22 is, for example, a display. For example, an output is made as to whether the motor is operating in an operating state permissible for the pump. If not, an error message is output. Optionally, at least one variable characterizing the operating state of the drive component 4 is graphically represented. For example, a course of a torque and/or a rotation speed is graphically represented on a display. In addition or alternatively, the operating state is represented acoustically or in a color coded manner by way of at least one LED.

Figure 2:
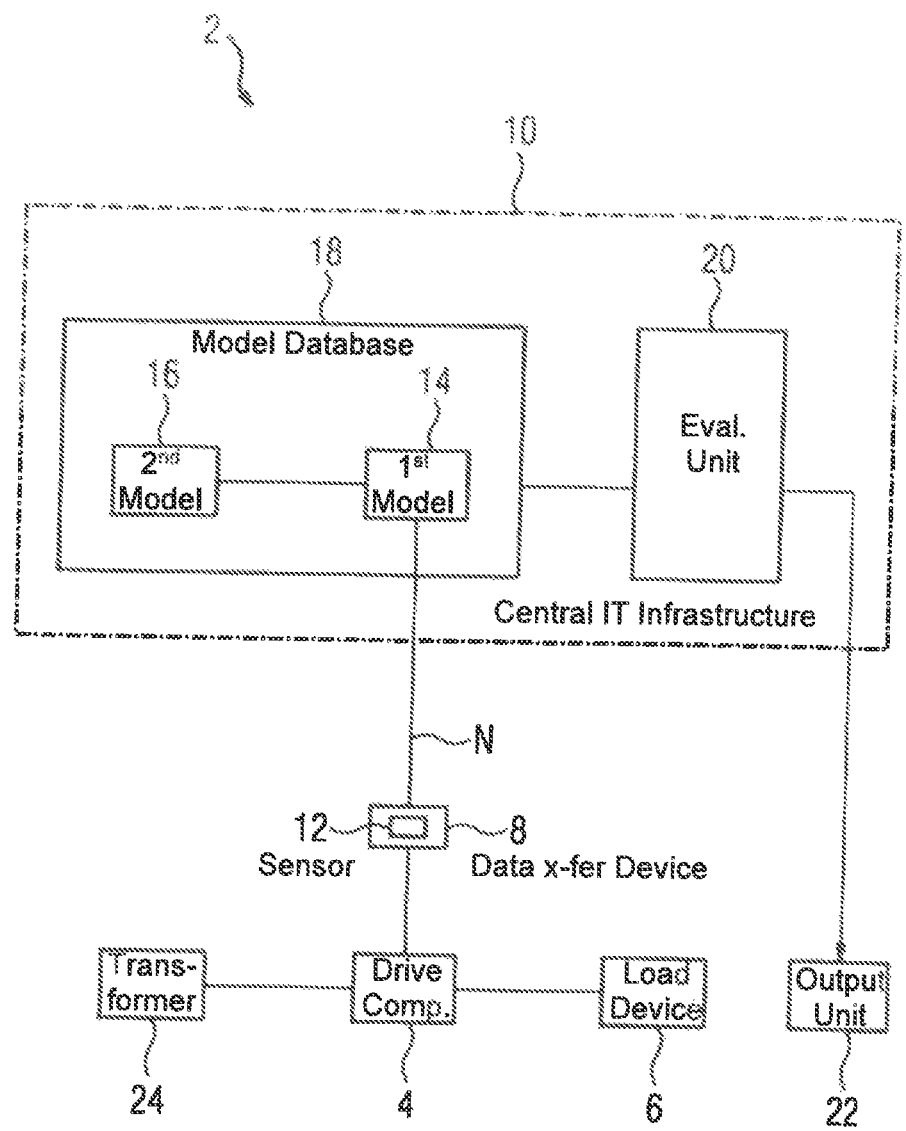

FIG. 2 shows a block diagram of a second embodiment of a system 2 for monitoring the operation of a drive component 4, wherein the drive component 4 is designed as an inverter which is fed via a mains transformer 24 and is used for powering the load device 6. The load device is, for example, a motor. The drive component 4 designed as an inverter has, as in FIG. 1, a device 8 which transfers data relating to the drive component 4 and/or an operation of the drive component 4 to a central IT infrastructure 10. Data relating to the drive component 4 comprises an individual product identification, for example a serial number. In addition, data relating to an operation of the drive component 4 comprises sensor data which is determined by at least one sensor 12. The sensor 12 is designed as a voltage measurement device and/or as a frequency measurement device. As in FIG. 1 the data is transferred at least partially via a network interface N to the central IT infrastructure 10.

In the central IT infrastructure 10 a model 14 of the inverter is assigned, in particular automatically, on the basis of the transmitted serial number, with an individual model 14 being defined by the serial number.

A model 16 of a virtual component is assigned to the model 14 of the inverter, with the virtual component mapping technical parameters of the mains transformer 24, such as a transmission ratio, in particular a complex one, and/or an efficiency, in particular dependent on the output current. The virtual component is assigned, for example, manually by a user or automatically, for example on the basis of data relating to the serial number stored in the central IT infrastructure 10.

An actual value for at least one operating parameter of the drive component 4 designed as an inverter is determined with the aid of the sensor data. For example, an actual value for at least one load point is determined from a DC-link voltage and an input current of the inverter.

Furthermore, a target value is determined from a correlation of the model 14 of the drive component 4 and the model 16 of the virtual component for the at least one operating parameter of the drive component 4 designed as an inverter. For example, a target value for the at least one load point is determined on the basis of model parameters of the model 14 of the inverter and the model 16 of the mains transformer 24.

In an evaluation unit 20, an operating state is determined from the actual value and the target value. The operating state is output at an output unit 22. For example, an output is made as to whether the inverter is operating incorrectly and/or whether there is an anomaly of the mains transformer 24 present. If this is the case, an error message, for example, is output. The further embodiment of the system 2 in FIG. 2 corresponds to that in FIG. 1.

To summarize, the invention relates to a method for monitoring the operation of at least one drive component 4. In order to improve the speed and security of the monitoring it is being proposed that data relating to at least one drive component 4 and/or one operation of the at least one drive component 4 is transferred to a central IT infrastructure 10, wherein the transferred data within the central IT infrastructure 10 is assigned to a model 14 of the at least one drive component 4, wherein a model 16 of at least one virtual component is assigned to the model 14 of the at least one drive component 14, wherein an operating state of the drive component 4 is determined with the aid of a correlation of the models 14, 16.

The invention claimed is:

1. A method for monitoring an operation of at least one drive component, comprising:
    transferring data relating to an individual product identification of the at least one drive component and data relatinq to an operation of the at least one drive component determined with at least one sensor to a central IT infrastructure,
    automatically assigning within the central IT infrastructure a first model of the at least one drive component based on the data relating to the individual product identification of the at least one drive component,
    automatically assigning within the central IT infrastructure to the first model a second model of at least one virtual component based on the data relating to the individual product identification of the at least one drive component, with the second model simulating a technical behavior of a component that is electrically or mechanically connected to the drive component,
    determining from the data of the at least one sensor an actual value for at least one operating parameter,
    determining a target value for the at least one operating parameter based on a correlation of the first and second models, and
    determining by at least one comparison operation an operating state of the drive component from the target value and the actual value of the at least one operating parameter.

2. The method of claim 1, further comprising determining the operating state of the drive component from at least one characteristic curve.

3. The method of claim 1, wherein the data relating to the operation of the at least one drive component comprise a temperature, a vibration or a magnetic field, or a combination thereof.

4. The method of claim 1, wherein the at least one drive component is an electrical rotating machine, and wherein the data relating to the operation of the electrical rotating machine comprises data selected a rotation speed and a torque.

5. The method of claim 1, wherein the at least one drive component is an inverter, and wherein the data relating to the operation of the inverter comprises data selected from a DC-link voltage and an input current of the inverter.

6. The method of claim 1, wherein the data are read at least partially from an optically readable code.

7. The method of claim 1, wherein the data is transferred at least partially via a network interface to the central IT infrastructure.

8. The method of claim 1, further comprising graphically displaying at least one variable characterizing the operating state of the drive component.

9. A system for monitoring an operation of at least one drive component, comprising:
    a device configured to transfer data relating to an individual product identification of the at least one drive component and data relatinq to an operation of the at least one drive component determined with at least one sensor to a central IT infrastructure,
    a first model of the at least one drive component automatically assigned within the central IT infrastructure based on the data relating to the individual product identification of the at least one drive component,
    a second model of at least one virtual component, with the second model being automatically assigned to the first model based on the data relating to the individual product identification of the at least one drive component, and simulating a technical behavior of a component which is electrically or mechanically connected to the at least one drive component, and
    an evaluation unit configured to determine from the data of the at least one sensor an actual value for at least one operating parameter,
    determine a target value for the at least one operating parameter based on a correlation of the first and second models, and determine by at least one comparison operation an operating state of the drive component from the target value and the actual value of the at least one operating parameter.

10. The system of claim 9, wherein at least one of the first and second models comprises a characteristic curve.

11. The system of claim 9, wherein the at least one sensor is a temperature sensor, a vibration sensor or as a magnetic field sensor, or a combination thereof.

12. The system of claim 9, wherein the at least one drive component is an electrical rotating machine, and wherein the data relating to the operation of the electrical rotating machine comprises data selected a rotation speed and a torque.

13. The system of claim 9, wherein the at least one drive component is an inverter, and wherein the data relating to the operation of the inverter comprises data selected from a DC-link voltage and an input current of the inverter.

14. The system of claim 9, wherein the at least one drive component comprises an optically readable code which contains at least some of the transferable data.

15. The system of claim 9, further comprising a network interface configured to transfer at least some of the data to the central IT infrastructure.

16. A non-transitory computer readable medium comprising a computer program product with program code, wherein the computer program, when loaded into a central IT infrastructure and executed by a processor of the central IT infrastructure, causes the central IT infrastructure to perform a method as set forth in claim 1.

* * * * *